(12) United States Patent
Apfelbaum et al.

(10) Patent No.: US 11,868,805 B2
(45) Date of Patent: Jan. 9, 2024

(54) SCHEDULING WORKLOADS ON PARTITIONED RESOURCES OF A HOST SYSTEM IN A CONTAINER-ORCHESTRATION SYSTEM

(71) Applicant: RED HAT, INC., Raleigh, NC (US)

(72) Inventors: Marcel Apfelbaum, Afula (IL); Swati Sehgal, Dublin (IE)

(73) Assignee: Red Hat, Inc., Raleigh, NC (US)

( * ) Notice: Subject to any disclaimer, the term of this patent is extended or adjusted under 35 U.S.C. 154(b) by 150 days.

(21) Appl. No.: 17/228,929

(22) Filed: Apr. 13, 2021

(65) Prior Publication Data

US 2022/0326986 A1    Oct. 13, 2022

(51) Int. Cl.
*G06F 3/00* (2006.01)
*G06F 9/48* (2006.01)
*G06F 9/54* (2006.01)

(52) U.S. Cl.
CPC .............. *G06F 9/4881* (2013.01); *G06F 9/54* (2013.01)

(58) Field of Classification Search
CPC ........................................................ G06F 9/54
USPC ....................................................... 719/310
See application file for complete search history.

(56) References Cited

U.S. PATENT DOCUMENTS

| | | | |
|---|---|---|---|
| 9,459,904 B2 | 10/2016 | Mehta et al. | |
| 2005/0154861 A1* | 7/2005 | Arimilli | G06F 9/5011 |
| | | | 712/216 |
| 2006/0101224 A1* | 5/2006 | Shah | G06F 9/5077 |
| | | | 711/173 |
| 2012/0304189 A1* | 11/2012 | Tominaga | G06F 3/0637 |
| | | | 718/104 |
| 2013/0046906 A1* | 2/2013 | Ripberger | G06F 3/0637 |
| | | | 710/12 |
| 2013/0055277 A1* | 2/2013 | Ashish | G06F 9/5083 |
| | | | 718/104 |
| 2014/0358972 A1* | 12/2014 | Guarrieri | G06F 16/21 |
| | | | 707/781 |
| 2016/0070652 A1* | 3/2016 | Sundararaman | G06F 3/0665 |
| | | | 711/154 |

(Continued)

FOREIGN PATENT DOCUMENTS

| | | | | |
|---|---|---|---|---|
| CN | 101276293 B | * | 2/2015 | .......... G06F 11/3433 |
| CN | 110389843 | | 10/2019 | |
| CN | 112052068 | | 12/2020 | |

OTHER PUBLICATIONS

Scheduling within Temporal Partitions: Response-time Analysis and Server Design, (Year: 2014).*

(Continued)

*Primary Examiner* — Lechi Truong
(74) *Attorney, Agent, or Firm* — Womble Bond Dickinson (US) LLP

(57) ABSTRACT

Techniques of scheduling workload(s) on partitioned resources of host systems are described. The techniques can be used, for example, in a container-orchestration system. One technique includes retrieving information characterizing at least one schedulable partition and determining an availability and a suitability of one or more of the schedulable partition(s) for executing a workload in view of the information. Each of the schedulable partition(s) includes resources of one or more host systems. The technique also includes selecting one or more of the schedulable partition(s) to execute the workload in view of the availability and the suitability.

15 Claims, 5 Drawing Sheets

(56) References Cited

U.S. PATENT DOCUMENTS

2019/0340168 A1\* 11/2019 Raman .................. G06F 16/219
2023/0267004 A1\* 8/2023 Doshi ................... G06F 9/5077
                                                            713/168

OTHER PUBLICATIONS

Zhen Xiao, Dynamic Resource Allocation Using Virtual Machines for Cloud Computing Environment. (Year: 2013).\*
Olivier Valery, A partial workload offloading framework in a mobile cloud computing context. (Year: 2015).\*
Klues, K. et al. (Apr. 1, 2020). "Kubernetes Topology Manager Moves to Beta—Align Up!," NVIDIA; Red Hat; Intel, 10 pages.
Chun, B. et al. (Oct. 2019). "Kubernetes Enhancement for 5G NFV Infrastructure," Samsung Research, Samsung Electronics Seoul, Korea, 4 pages.
Telco Cloud Platform 5G-Edition Reference Architecture created 2021, VMware, Inc, 106 pages.
Brownlow, P. "CPU Management—CPU Pinning and Isolation in Kubernetes Technology Guide," Intel Corporation, 24 pages.

\* cited by examiner

200

```
┌─────────────────────────────────────────────────────────┐
│ RETRIEVE INFORMATION CHARACTERIZING AT LEAST ONE OF A   │
│ PLURALITY OF SCHEDULABLE PARTITIONS, EACH OF THE        │
│ PLURALITY OF SCHEDULABLE PARTITIONS COMPRISING          │
│ COMPUTER RESOURCES OF AT LEAST ONE HOST SYSTEM          │
│                         201                             │
└─────────────────────────────────────────────────────────┘
                              │
                              ▼
┌─────────────────────────────────────────────────────────┐
│ DETERMINE AN AVAILABILITY AND A SUITABILITY OF AT LEAST │
│ ONE OF THE PLURALITY OF SCHEDULABLE PARTITIONS FOR      │
│ EXECUTING AT LEAST ONE WORKLOAD TASK IN VIEW OF THE     │
│                      INFORMATION                        │
│                         202                             │
└─────────────────────────────────────────────────────────┘
                              │
                              ▼
┌─────────────────────────────────────────────────────────┐
│ SELECT ONE OR MORE OF THE AT LEAST ONE OF THE PLURALITY │
│ OF SCHEDULABLE PARTITIONS TO EXECUTE ONE OR MORE OF     │
│ THE WORKLOAD TASK(S) IN VIEW OF THE AVAILABILITY AND THE│
│                      SUITABILITY                        │
│                         203                             │
└─────────────────────────────────────────────────────────┘
```

REQUEST (E.G., BY TRANSMITTING A QUERY OR OTHER MESSAGE, ETC.) FROM AT LEAST ONE OF THE HOST SYSTEM(S) FOR INFORMATION ASSOCIATED WITH THE COMPUTER RESOURCES 306

RECEIVE THE INFORMATION ASSOCIATED WITH THE COMPUTER RESOURCES FROM ONE OR MORE OF THE HOST SYSTEM(S) 307

PROCEED TO OPERATION 300 308

RECEIVE INFORMATION COMPRISING A USER CONFIGURATION 309

DETERMINE, IN VIEW OF THE INFORMATION, THAT THE COMPUTER RESOURCES OF ONE OR MORE OF THE HOST SYSTEM(S) SHOULD BE INSTANTIATED INTO A PLURALITY OF SCHEDULABLE PARTITIONS 310

PROCEED TO OPERATION 300 311

FIG. 3C

SCHEDULING WORKLOADS ON PARTITIONED RESOURCES OF A HOST SYSTEM IN A CONTAINER-ORCHESTRATION SYSTEM

TECHNICAL FIELD

Aspects of the present disclosure relate to host systems in a container-orchestration system, and more particularly, to partitioning resources of a host system in a container-orchestration system.

BACKGROUND

Some container-orchestration systems include one or more containers that may contain one or more workloads. An example of a workload is a container image, which can encompass a containerized application, its corresponding runtime environment, or a combination thereof. In one scenario, a component of a container-orchestration system known as a scheduler, uses a process called scheduling, to select resources of a host system to run (e.g., execute, etc.) one or more workloads. A scheduler may monitor a container-orchestration system to discover one or more workloads in the container-orchestration system that are not assigned to and run by or on resources of any host systems in the container-orchestration system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a flow diagram of a method of using one or more schedulable partitions to run one or more workloads, in accordance with one or more embodiments.

FIG. 3B is a flow diagram of a method of acquiring resources of at least one host system that are eventually instantiated into a plurality of schedulable partitions, in accordance with one or more embodiments.

FIG. 3C is a flow diagram of a method of activating an instantiation of resources of at least one host system into a plurality of schedulable partitions, in accordance with one or more embodiments.

DETAILED DESCRIPTION

Figure 1:
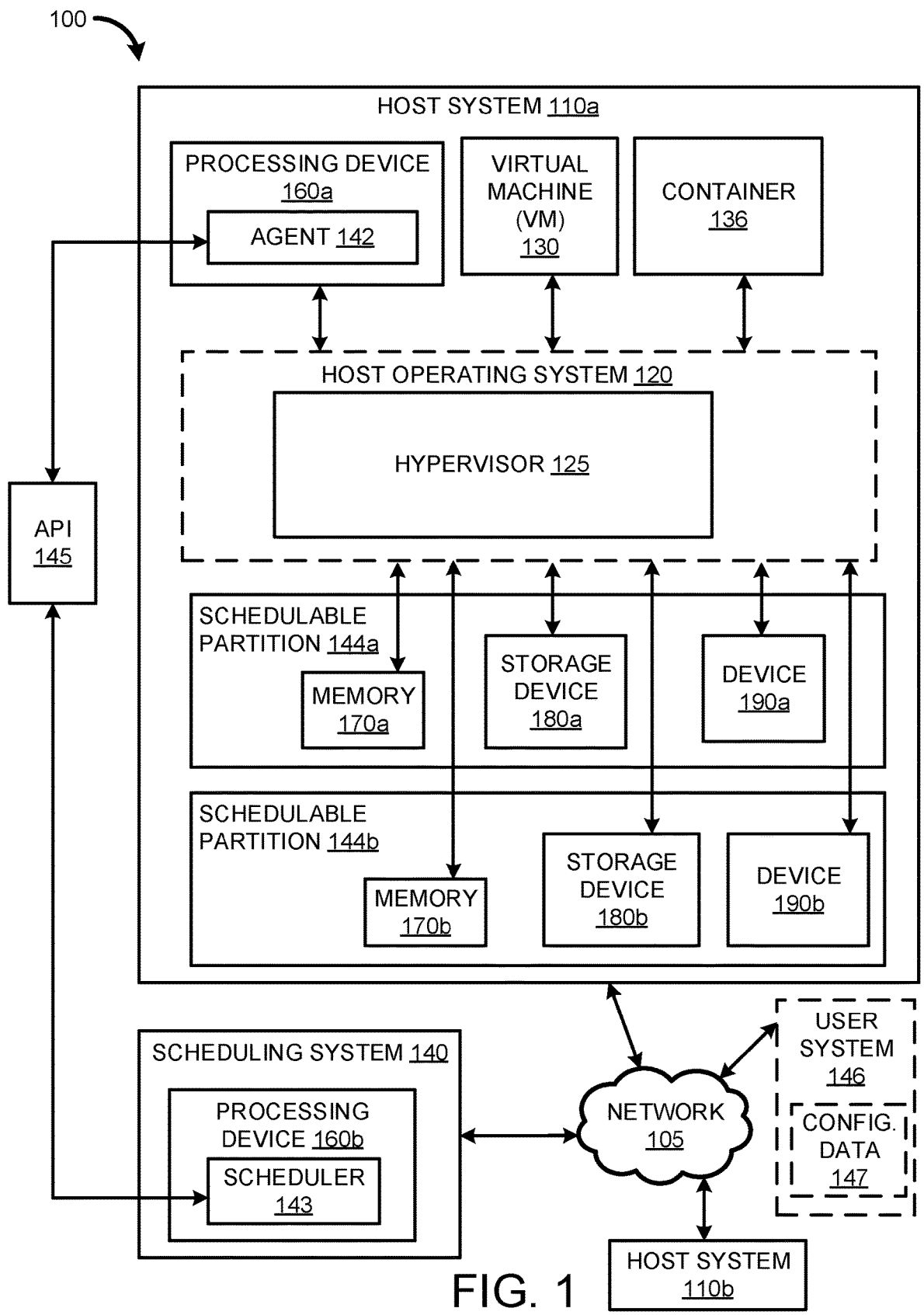
FIG. 1 is a block diagram that illustrates an example computer system architecture, in accordance with some embodiments of the present disclosure.

In embodiments, a container-orchestration system may include a host system, an agent to instantiate the host system's resources into schedulable partitions, and a scheduler to select at least one of the schedulable partitions for running a workload. As used herein, a "resource," a "computer resource" and their variations refer to a physical or virtual component of limited availability within a computer system (e.g., a host system). Examples of resources include a hardware resource, a software resource, a networking resource, a storage resource, any other type of suitable resource, or any combination of two or more of the preceding types of resources. For an example, the agent queries the host system to determine (e.g., acquire, etc.) information about the host system's resources. A non-limiting example of such information is information describing the resources' characteristics, such as the host system's available computing power, unavailable computing power, types of processing devices (e.g., central processing units (CPUs), graphics processing units (GPUs), microprocessors, etc.), number of processing devices, specifications of the processing devices, types of memory (e.g., random access memory (RAM), read only memory (ROM), flash memory, etc.), available memory, unavailable memory, a cache space, a network throughput, a speed associated with the host system's input/output operations, an amount of the host system's input/output operations, etc.

In one example, the agent uses the determined information described above to partition the host machine's resources into multiple schedulable partitions. As used herein, a "schedulable partition" and its variations refer to a subset of a host machine's resources that may, among others, be used to run one or more workloads.

The agent can expose the schedulable partitions and the information about the schedulable partitions to the scheduler via an application programming interface (API) tailored for communicating such information. The scheduler can use the information about the schedulable partitions to determine available and suitable schedulable partitions for workloads. In view of the determination, the scheduler can select at least one schedulable partition to handle (e.g., execute, etc.) at least one workload.

In conventional container-orchestration systems, the scheduler may select resources of a host system that are already in use, are outdated, or have insufficient computing resources to run a particular workload. In some scenarios, even if the selection performed by the scheduler is successful, the scheduler may fail to select the most optimal host system or the most optimal resources of a host system to run the workload. One example of a suboptimal selection includes the scheduler selecting a storage resource (e.g., memory, etc.) that is not directly coupled (i.e., non-local) to a hardware resource (e.g., a processing device, such as a central processing unit (CPU), etc.) instead of a storage resource that is directly coupled (i.e., local) to hardware resource. The incorrect and suboptimal selections by the scheduler are due, at least in part, to the scheduler having insufficient information about the host system or the resources of the host system.

Using container-orchestration systems to implement computer architectures, such as a fifth generation (5G) telecommunications (Telco) computer architecture that is based on the 5G technology standard, is becoming more prevalent. With specific regard to the example of a 5G Telco computer architecture, such an architecture is primarily aimed at realizing ultra-high speeds and low latency. As demand for these and other computer architectures increases, pressures to improve the operations (e.g., speeds, latencies, etc.) associated with running workloads in such architectures is also increasing. Delivering a computer architecture that can successfully handle the pressures described above, such as a 5G Telco computer architecture that produces ultra-high speeds and low-latencies, may include at least one latency-sensitive workload in the computer architecture. As used herein, a "latency-sensitive workload" and its variations refer to a workload that is to be run (e.g., executed, etc.) with a low latency, a high throughput, or a combination thereof. Running these and other workloads may necessitate optimizing the scheduler's selection of resources of a host system. This can assist with preventing a suboptimal operation of one or more components of a computer architecture that includes a container-orchestration system. It is to be appreciated that the description provided herein is applicable to any type of computer architecture that includes or is based on a container-orchestration system, not just 5G Telco computer architectures.

An example of at least one of the optimizations described above includes the scheduler selecting a schedulable partition that includes a local storage resource for a hardware resource, as opposed to a non-local storage resource based on one or more hardware supported partitioning technologies, such as a non-uniform memory access (NUMA) technology or sub-NUMA technology. This result can improve the throughput, bandwidth, and latency associated with executing one or more workloads in a computer architecture that includes a container-orchestration system. For example, the use of schedulable partitions and hardware supported partitioning technologies can assist with improving the running of latency-sensitive and other workloads in a computer architecture, such as a 5G Telco computer architecture that is aimed at providing ultra-fast speeds and low latencies. Details of the example optimization described above are provided below in connection with at least one of FIGS. 1-4.

It is to be appreciated that, in at least one container-orchestration system, the control plane is capable of appropriately selecting one or more host systems to work with the scheduler. For example, the control plane is based on or comprises a control plane in a cloud computer architecture. Embodiments described herein are directed to improving the scheduler's interactions with the host systems chosen by the control plane. In some embodiments, the improved interactions are based, at least in part, on optimizing a scheduler's selection of resources of a host system in a container-orchestration system, which can in turn assist with improving utilization, management or operational efficiency of the host system. In at least one embodiment, the optimization enables the scheduler to gain more information about the resources of a host system than was previously available while mitigating any potential issues. In this way, the embodiments set forth herein can assist with optimizing operational efficiency, management, and utilization of a host system's resources and the scheduler itself. These optimizations can, in turn, lead to improved functioning of one or more components, devices, or systems in container-orchestration systems.

FIG. 1 is a block diagram that illustrates an example computer system architecture 100, in accordance with some embodiments of the present disclosure. It is to be appreciated that other computer system architectures 100 are possible, and that the implementation of a computer system utilizing examples of some or all of the inventive subject matter set forth herein are not necessarily limited to the specific architecture depicted in FIG. 1. For example, the computer system architecture 100 may be based on or comprise a 5G Telco computer architecture, a cloud computer architecture, any other suitable computer architecture, or any combination of two or more of the preceding computer architectures.

As shown in FIG. 1, the computer system architecture 100 includes host systems 110a, b and scheduling system 140. The host systems 110a, b and scheduling system 140 include one or more processing devices 160a, b, memory 170a, b, which may include volatile memory devices (e.g., random access memory (RAM)), non-volatile memory devices (e.g., flash memory) and/or other types of memory devices, a storage devices 180a, b (e.g., one or more magnetic hard disk drives, a Peripheral Component Interconnect (PCI) solid state drive, a Redundant Array of Independent Disks (RAID) system, a network attached storage (NAS) array, etc.), and one or more devices 190a, b (e.g., a Peripheral Component Interconnect (PCI) device, network interface controller (NIC), a video card, an input/output (I/O) device, etc.). In at least one embodiment, the devices 190a, b may include one or more processing devices or integrated circuits (ICs), such as one or more central processing units (CPU), one or more graphics processing units (GPU), one or more microprocessors, any other type of processing device or combination of processing devices, or any combination thereof. In certain implementations, memory 170a, b may allow for non-uniform memory access (NUMA), such that memory access time depends on the memory location relative to the processing devices 160a, b and/or the devices 190a, b. One or more other suitable hardware supported partitioning technologies (e.g., sub-NUMA technology, etc.) may be used in lieu of or in combination with the NUMA technology.

It should be noted that the memory 170a, b are collectively memory 170 of the host system 110a and may sometimes be referred to as such in the present disclosure. Furthermore, the storage devices 180a, b are collectively storage device 180 of the host system 110a and may sometimes be referred to as such in the present disclosure. Additionally, the devices 190a, b are collectively device 190 of the host system 110a and may sometimes be referred to as such the present disclosure. Furthermore, use of the phrase "computer resources of the host system 110a" and its variations in the present disclosure is intended to refer to one or more resources of the host system 110a regardless of whether such resources are illustrated in FIG. 1. Examples of the resources of the host system 110a include, but are not limited to, the memory 170, the storage device 180, the device 190, or a combination thereof.

It should also be noted that although, for simplicity, a single processing device 160a, b, memory 170, storage device 180, and device 190 are depicted in FIG. 1, other embodiments of host systems 110a, b and scheduling system 140 may include a plurality of processing devices, memory, storage devices, and devices. Each of the host systems 110a, b and scheduling system 140 may be a server, a mainframe, a workstation, a personal computer (PC), a mobile phone, a palm-sized computing device, etc. In embodiments, the host systems 110a, b and scheduling system 140 may be separate computing devices. In some embodiments, host systems 110a, b and/or scheduling system 140 may be implemented by a single computing device. For clarity, some components of the scheduling system 140 and host system 110b are not shown. Furthermore, although the computer system architecture 100 is illustrated as having two host systems, embodiments of the disclosure may utilize any number of host systems.

The host system 110a, b may additionally include a virtual machine (VM) 130, a container 136, and/or a host operating system (OS) 120. It is to be appreciated that more than one VM, container or host OS can exist in the architecture 100. The VM 130 is a software implementation of a machine that executes programs as though it was an actual physical machine. The container 136 acts as isolated execution environments for different functions of applications. The host OS 120 manages the hardware resources of the computer system and provides functions such as inter-process communication, scheduling, memory management, and so forth.

The host OS 120 may include a hypervisor 125 (which may also be known as a virtual machine monitor (VMM)), which provides a virtual operating platform for the VMs 130 and manages their execution. It is to be appreciated that more than one hypervisor can exist in the architecture 100. The hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. The hypervisor 125 may present other software (e.g., "guest" software) with an abstraction of one or more VMs that provide the same or different abstractions to various guest software (e.g., guest operating system, guest applications, etc.). In some alternative implementations, the hypervisor 125 may be external to host OS 120, rather than embedded within host OS 120, or may replace host OS 120.

In at least one embodiment, the host systems 110*a, b*, and scheduling system 140 are coupled to each other (e.g., may be operatively coupled, communicatively coupled, may communicate data/messages with each other) via network 105. The network 105 may be a public network (e.g., the internet), a private network (e.g., a local area network (LAN) or wide area network (WAN)), any other network, or a combination thereof. In one embodiment, the network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110*a, b* and/or scheduling system 140.

As shown in FIG. 1, one or more embodiments of the host system 110*a* may include an agent 142. The processing device 160*a* may implement (e.g., execute, etc.) the agent 142. In other embodiments, the processing device 160*a* may implement the agent 142 and one or more other components. It is to be appreciated that one or more of the host systems 110*a, b* can have one or more agents 142 therein.

The agent 142 may have several functions. One function of the agent 142 includes acquiring information about the host system 110*a*'s resources. For example, the agent 142 communicates one or more messages (e.g., transmitting at least one query, etc.) to the host system 110*a* requesting information about the host systems 110*a*'s resources. A non-limiting example of such information is information describing the resources' characteristics, such as the host system 110*a*'s available computing power, unavailable computing power, types of processing devices (e.g., CPUs, GPUs, microprocessors, etc.), number of processing devices, specifications of the processing devices, types of memory (e.g., RAM, ROM, flash memory, etc.), available memory, unavailable memory, etc. It is to be appreciated that the agent 142 can acquire information about resources of one or more of the host system 110*a, b* in the computer architecture 100.

Another function of the agent 142 includes receiving the requested information described above from the host system 110*a*. The agent 142 may process the received information into a format that is readable by the scheduler 143 or one or more other components, devices, or systems in the architecture 100.

Yet another function of the agent 142 includes instantiating (e.g., creating, etc.) the resources of the host system 110*a* into multiple schedulable partitions 144*a, b* in response to processing the received information described above. A "schedulable partition" and its variations refer to a subset of a host machine's computer that may, among others, be used to run one or more workloads. It is to be appreciated that a workload may be run by one or more schedulable partitions. For example, a schedulable partition can assist with enabling a more efficient technique of running one or more workloads than was previously available in at least one currently available container-orchestration system. The efficient technique includes, in one scenario, circumscribing the one or more workloads to the subset of the host machine's computer (i.e., the schedulable partition) to minimize or eliminate suboptimal running of the one or more workloads. For example, the host machine can comprise one or more physical or virtual machines in a computer architecture. One example of such an architecture is a cloud computer architecture. The host machine can be distributed across multiple machines or reside on one machine. It is to be appreciated that the agent 142 can instantiate resources of one or more of the host systems 110*a, b* into multiple schedulable partitions. A schedulable partition, for example, can be based on a NUMA architecture such that the storage resources (e.g., memory, etc.), the hardware resources (e.g., one or more processing devices, etc.), and zero or more other components, devices, or resources in the schedulable partition are clustered in order to assist with improving performance or scalability of the components, devices, or resources in the schedulable partition. A NUMA architecture may, for example, include a configuration of one or more processing devices and zero or more other devices in a host system to share a local memory instead of a non-local memory. A NUMA architecture can allow for more efficient operation, management, and utilization of the memory, the processing device(s), or the zero or more other devices in the schedulable partition. For example, and with regard to FIG. 1, the schedulable partition 144*a* may include one or more processing devices 190*a* and zero or more other devices (e.g., at least one PCI device, etc.). In this example, the processing device(s) 190*a* or the zero or more other devices may be coupled to a local memory 170*a* instead of a non-local memory 170*b*. In this way, the processing device(s) 190*a*, the zero or more other devices, and the local memory 170*a* are clustered as a multiprocessing system. This clustering can assist with enabling the processing device(s) 190*a*, the zero or more other devices, or the local memory 170*a* to operate more efficiently (e.g., faster, etc.) because these devices can access the local memory 170*a* faster and with shorter communication paths than the non-local memory 170*b*. In view of the explanation above, partitioning the host system 110*a*'s resources as described herein can allow for a more efficient operation, utilization, and management of the resources than was previously available (that is, when compared to an architecture that lacks schedulable partitions).

In some embodiments, one or more schedulable partitions (e.g., partition 144*a*, partition 144*b*, any combination thereof, etc.) may be configured to operate as a host machine. For example, the schedulable partition 144*a* may be configured to operate as a host machine. Consequently, and for this example, the agent 142 and/or the scheduler 143 treats the schedulable partition 144a as a host machine that is distinct from the other host machines 110a, b.

In some embodiments, a schedulable partition (e.g., 144a, 144b, etc.) includes at least one resource from one or more host machines (e.g., machine 110a, machine 110b, any combination thereof, etc.). For example, each resource that is part of a schedulable partition (e.g., 144a, 144b, etc.) is part of one host machine (e.g., 110a, 110b, etc.). For another example, a schedulable partition (e.g., 144a, 144b, etc.) may include a first resource that is part of the host system 110a and a second resource that is part of the host system 110b. The embodiments and examples described above can be applicable to a schedulable partition that has or is based on a NUMA architecture, a sub-NUMA architecture, any other architecture based on one or more hardware partitioning technologies, or any combination thereof.

In some embodiments, a resource (e.g., memory 170a, storage device 180a, device 190a, etc.) that is part of a host machine can be part of one or more schedulable partitions. For example, a resource (e.g., the memory 170a, etc.) can be part of a schedulable partition (e.g., partition 144a, etc.) and not part of any other schedulable partition (e.g., partition 144b, any other partition in architecture 100, any combination thereof, etc.). The embodiments and examples described above can be applicable to a schedulable partition that has or is based on a NUMA architecture, a sub-NUMA architecture, any other architecture based on one or more hardware partitioning technologies, or any combination thereof.

The agent 142, in some embodiments, communicates information about the schedulable partitions 144a, b to a scheduler 143, which is described in more detail below. The information about the schedulable partitions 144a, b includes, but is not limited to, information describing each schedulable partition 144a, b's characteristics, such as each schedulable partition 144a, b's available computing power, unavailable computing power, types of processing devices (e.g., CPUs, GPUs, microprocessors, etc.), number of processing devices, specifications of the processing devices, types of memory (e.g., RAM, ROM, flash memory, etc.), available memory, unavailable memory, etc.

For example, the agent 142 may communicate the information about the schedulable partitions 144a, b to the scheduler 143 via an application programming interface (API) 145. In an embodiment, the API 145 is a control plane component that is tailored for communication of information about the schedulable partitions 144a, b between the agent 142 and the scheduler 143. For example, the API 145 is specifically tailored to the agent 142 and the scheduler 143 for exclusively communicating information about the schedulable partitions 144a, b. For another example, the API 145 may be tailored to communicate information about the schedulable partitions 144a, b and other data between the agent and the scheduler 143. That is, and for this example, the API 145 is not used exclusively for communicating information about the schedulable partitions 144a, b. For example, the API 145 can be part of a larger API, such as an API (not shown in FIG. 1) in a control plane associated with the architecture 100 that enables (e.g., allows, facilitates, etc.) communications between the components of the architecture 100. The API 145 can be implemented using any appropriate technique, any appropriate technology, or any combination thereof that is suitable for implementing (e.g., realizing, etc.) an API. For example, the API 145 may be implemented using a processing device (e.g., any of the processing devices 160a, b, any of the devices 190a, b, one or more other processing devices, any combination thereof, etc.). For example, the API 145 can be based on or comprise a cloud API, which can be a type of API that enables development of applications or services used for provisioning of hardware, software, platforms, or other components in a cloud computer architecture.

In embodiments, a scheduling system 140 comprises a scheduler 143. In some scenarios, the scheduling system 140 may be configured to perform scheduling tasks beyond the capabilities of the scheduler 143. Further details regarding the scheduler 143 are described at FIGS. 2-3C below.

In some embodiments, the processing device 160b may implement (e.g., execute, etc.) the scheduler 143. The scheduler 143 may control the selection of resources of the host systems 110a, b to run (e.g., execute, etc.) one or more workloads associated with the architecture 100. For example, the scheduler 143 may select some or all of the resources of the host system 110a (e.g., memory 170, processing device 160a, storage device 180, device 190, VM 130, etc.) to execute one or more workloads. At least one of the workloads described herein in connection with at least one of FIGS. 1-4 includes a cloud workload, which can comprise a workload that is run on or by (e.g., executed on, etc.) a computing resource in or associated with a cloud computer architecture. Furthermore, and for example, the scheduler schedules a workload (e.g., a cloud workload, etc.) by assigning the workload to a subset of the resources (e.g., hardware resources, etc.) of the host system 110a. As described above, such a subset can be a schedulable partition of the host system 110a. Examples of such a schedulable partition are shown in FIG. 1 as schedulable partitions 144a, b.

The scheduler 143, in an embodiment, is tasked with processing (e.g., receiving, assigning, etc.) one or more workloads associated with the architecture 100. in embodiments, the architecture 100 may represent a container-orchestration system 100. The scheduler 143 may receive information about one or more workloads that are to be run (e.g., executed, etc.). The scheduler 143 may assign at least one of the workload(s) to the host system 110a or 110b.

With regard again to FIG. 1, the scheduler 143 receives or retrieves information about the schedulable partitions 144a, b and/or any other data from the agent 142 via the API 145. The scheduler 143 processes the information about the schedulable partitions 144a, b to gain insight into the host systems 110a, b. At least one embodiment of the scheduler 143 determines—based, at least in part, on the information received from the agent 142—an availability or a suitability of one or more of the host systems 110a, b for running one or more workloads. For example, and more specifically, the scheduler 143 does not determine or refrains from determining an availability or a suitability of the specific resources of the host system 110a (e.g., the memory 170, the storage device 180, the device 190, etc.). Instead, and for this example, the scheduler 143 determines an availability or a suitability of the resources of the schedulable partitions 144a, b to run one or more workloads based, at least in part, on the information received from the agent 142 via the API 145. In response to the scheduler 143's determination, the scheduler 143 selects one or more of the schedulable partitions 144a, b to run (e.g., execute, etc.) at least one of the workloads.

In an embodiment, the scheduler 143 communicates, via the API 145, information about the determination or the selection performed by the scheduler 143 to the agent 142. For one example, the agent 142 processes the information describing the determination or the selection performed by the scheduler 143 to monitor the schedulable partitions 144a, b and their assigned workload(s). Monitoring the selection can, for one embodiment, include the agent 142 acquiring (e.g., determining, collecting, etc.) information about the schedulable partitions 144a, b that were selected by the scheduler 143 and the one or more workloads that were assigned to the schedulable partitions 144a, b by the scheduler 143. Examples of the acquired information include, but are not limited to, a specification describing one or more features of the resources of the schedulable partitions 144a, b, an estimate of the resources of the schedulable partitions 144a, b required to run the workload(s) assigned to the schedulable partitions 144a, b, and any combination thereof. Other examples include a performance of some or all of the resources of the schedulable partitions 144a, b, a current condition describing a present state of some or all of the resources of the schedulable partitions 144a, b, etc. Each of the specification, estimate, performance and current condition described above can comprise any suitable information associated with a resource. For example, the specification can include information describing the number and types of CPUs in some or all of the schedulable partitions 144a, b, the number and types of memory in some or all of the schedulable partitions 144a, b, etc. An example estimate can include an amount of available computing resources of some or all of the schedulable partitions 144a, b. The performance can, for example, include a response time of a CPU in one of the schedulable partitions 144a, b, a memory access time associated with a CPU or a memory in one of the schedulable partitions 144a, b, etc. The current condition can, for example, include a measured temperature of a CPU in one of the schedulable partitions 144a, b.

For an embodiment, the agent 142 processes the acquired information to generate information characterizing an association between some or all of the schedulable partitions 144a, b that were selected by the scheduler 143 and the one or more workloads that were assigned to the selected schedulable partitions 144a, b by the scheduler 143. For example, the agent 142 processes the information characterizing the association, the acquired information described above, or the information describing the determination and the selection performed by the scheduler 143 to enforce the scheduler 143's assignment of the workload(s) to the schedulable partitions 144a, b selected by the scheduler 143 for running the workload(s).

For one example, the agent 142 can perform this enforcement by resource assignment, which is based on the agent 142's use of control groups ("cgroups") and quality of service ("QoS") classes. Cgroups are used by the agent 142 to constrain the resources of the host machine 110a, b (i.e., schedulable partitions 144a, b, etc.) that have been selected by the scheduler 143 to run the workload(s). More specifically, a cgroup is a feature that the agent 142 uses to organize a workload and set a limit on the amount of resources of a schedulable partition 144a, b that have been selected by the scheduler 143 to run the workload. For example, the agent 142 organizes cgroups into a hierarchy. This enables the agent 142 to manipulate the hierarchy of cgroups on the host system 110a, b. In this way, the agent 142 can enforce the scheduler 143's assignment of the workload(s) to the schedulable partitions 144a, b selected by the scheduler for run the workload(s).

In at least one embodiment, the agent 142 performs the enforcement without directly interfacing with a file system associated with the cgroups, known as a cgroupfs. Instead, and for this example, the agent 142 accesses and utilizes a library (e.g., a common library, etc.) in the computer architecture (not shown in FIG. 1). The library comprises an abstraction that enables the agent 142 to operate with the cgroupfs, one or more other software components, or any combination thereof. Examples of such software components include a software suite that provides an array of software components for a Linux OS (e.g., systemd, etc.), any other suitable software component, or any combination thereof.

The agent 142 can also perform the enforcement described above based, at least in part, on a Quality of Service (QoS) class. Each workload may have a corresponding QoS class that the agent 142 uses to determine an eviction order or priority for the workloads. For example, the agent 142 determines an eviction order or priority for the workloads based on the requested or maximum amounts of resources of the host system 110a, b reserved for the workloads. In at least one scenario, the agent 142 terminates any workload(s) that consume more resources of the host system 110a, b than the requested or maximum resources reserved for the workload(s). In some embodiments, the agent 142 monitors the workload(s) assigned to the schedulable partitions 144a, b and terminates any workload(s) that consumes more resources of the schedulable partitions 144a, b than the requested or maximum resources reserved for the workload(s). In this way, the agent 142 can enforce the scheduler 143's assignment of the workload(s) to the schedulable partitions 144a, b selected by the scheduler for running the workload(s). Accordingly. the agent 142— through its enforcement of the assignment described above—can assist the scheduler 143 with appropriately running one or more workloads. One or more of the preceding embodiments may be combined in any form.

An optional user system 146 can be included in the architecture 100. The optional user system 146 can be similar to or the same as the host system 110a or 110b. For example, the computer architecture 100 is based on or comprises a cloud computer architecture. In this example, the optional user system 146 can be based on or comprise a user system in the cloud computer architecture 100. The optional user system 146, for example, enables a user or group of users (e.g., a cloud administrator, any other kind of administrator, etc.) to communicate data (e.g., any kind of suitable data, etc.) with the rest of the architecture 100. In one embodiment, the optional user system 146 includes configuration (config.) data 147, which enables a user or group of users to turn "on" the agent 142's ability to create (e.g., instantiate, etc.) some or all of the schedulable partitions 144a, b. For one example, the user system 146 communicates information comprising the config. data 147 in response to one or more user inputs received by the user system 146 via an input/output (I/O) device (not shown in FIG. 1). For a further example, the user system 146 communicates the information comprising the config. data 147 via the network 105 to the agent 142. The agent 142 can, for example, process the config. data 147 and initiate the instantiation of the resources of the host system 110a into some or all of the schedulable partitions 144a, b in response to the processing of the config. data 147. Although not shown in FIG. 1, and for example, the optional user system 146 can be operatively coupled to the API 145 instead of or in addition to the network 105. In this example, the user system 146 can communicate information (e.g., config. data 147, any other suitable data, any combination thereof, etc.) with the agent 142 and/or the scheduler 143 via the API 145.

FIG. 2 is a flow diagram of a method 200 of using one or more schedulable partitions to run one or more workloads, in accordance with one or more embodiments. The method 200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiment, at least one portion of the method 200 may be performed by a scheduler. For example, some or all of the method 200 can be performed by the scheduler 143 described above in connection with FIG. 1.

With reference to FIG. 2, the method 200 illustrates example functions used by various embodiments. Although specific function blocks ("blocks") are disclosed in the method 200, such blocks are examples. That is, embodiments are well suited to performing various other blocks or variations of the blocks recited in the method 200. It is appreciated that the blocks in the method 200 may be performed in an order different than presented, and that not all of the blocks in the method 200 may be performed.

The method 200 begins at block 201, where the processing logic retrieves information characterizing at least one of a plurality of schedulable partitions, each of the plurality of schedulable partitions comprising resources of at least one host system, as previously described. In embodiments, the processing logic may retrieve the information via an API, such as the API 145 described above in connection with FIG. 1. The resources can include any kind of resources known in the art, including, for example, computing resources of a NUMA architecture. An example of a NUMA architecture is described above in connection with FIG. 1. It is to be appreciated that one or more other suitable hardware supported partitioning technologies (e.g., sub-NUMA technology, etc.) can be used in lieu of or in combination with NUMA technology.

At block 202, where the processing logic determines an availability and a suitability of at least one of the plurality of schedulable partitions for executing at least one workload in view of the information from block 201. At least one example of this determination is described above in connection with FIG. 1 (e.g., the scheduler 143, the agent 142, any combination thereof, etc.).

Figure 3A:
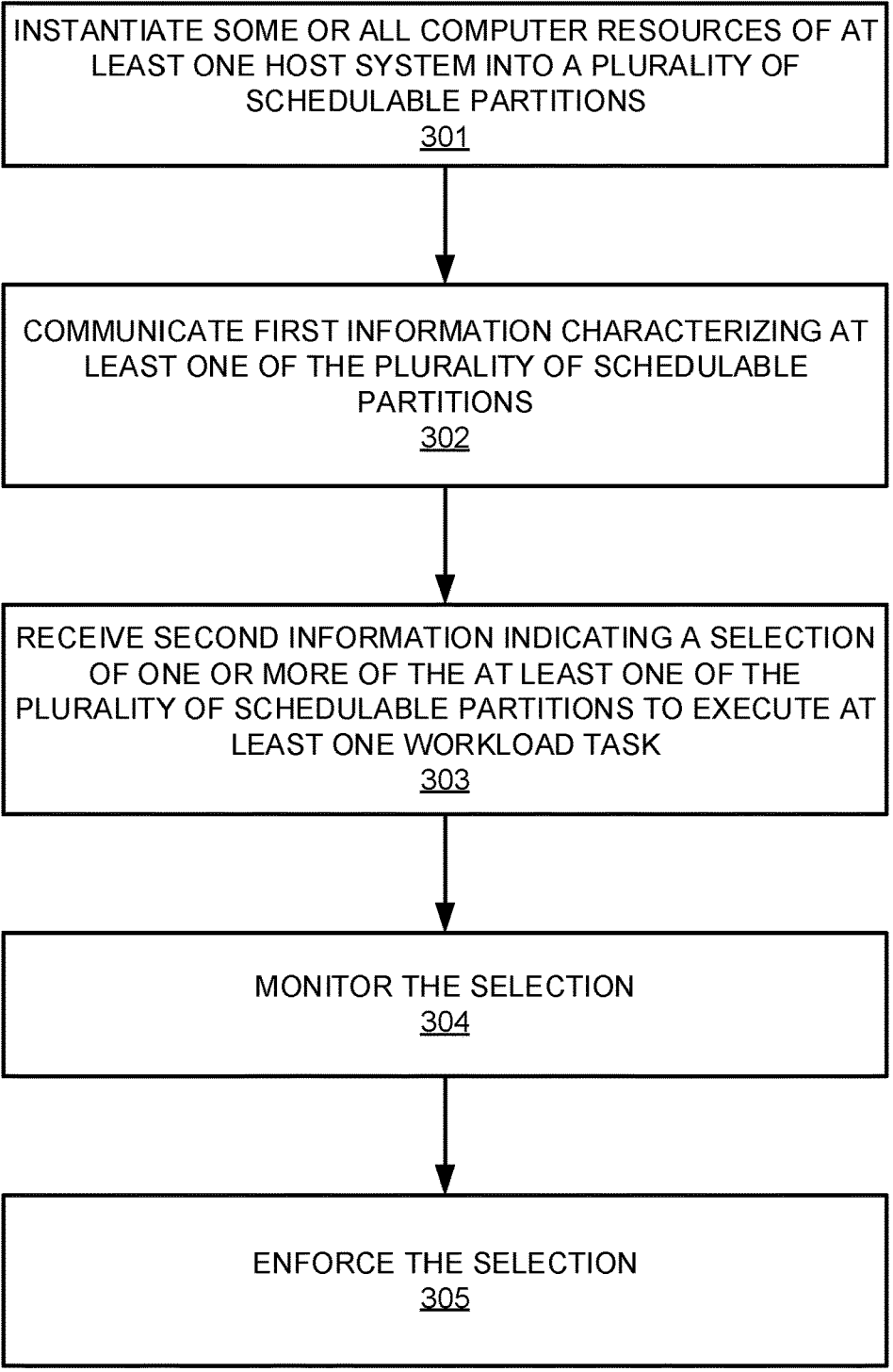
FIG. 3A is a flow diagram of a method of using one or more schedulable partitions to run one or more workloads, in accordance with one or more embodiments.

At block 203 of the operation 200, the processing logic selects one or more of the at least one of the plurality of schedulable partitions to execute one or more of the workload(s) in view of the determination in block 202 (e.g., the determined availability and the suitability, etc.). At least one example of this selection is described above in connection with FIG. 1 (e.g., the scheduler 143, the agent 142, any combination thereof, etc.) FIG. 3A is a flow diagram of a method 300 of using one or more schedulable partitions to run one or more workloads, in accordance with one or more embodiments. The method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiment, at least one portion of the method 300 may be performed by an agent. For example, some or all of the method 300 can be performed by the agent 142 described above in connection with FIG. 1.

With reference to FIG. 3A, the method 300 illustrates example functions used by various embodiments. Although specific function blocks ("blocks") are disclosed in the method 300, such blocks are examples. That is, embodiments are well suited to performing various other blocks or variations of the blocks recited in the method 300. It is appreciated that the blocks in the method 300 may be performed in an order different than presented, and that not all of the blocks in the method 300 may be performed.

The method 300 begins at block 301. Here, the processing logic instantiates some or all resources of at least one host system into a plurality of schedulable partitions. At least one example of this instantiation is described above in connection with FIG. 1 (e.g., the scheduler 143, the agent 142, any combination thereof, etc.). Examples of schedulable partitions include NUMA-based schedulable partitions, which are described above in connection with FIG. 1. Examples of host systems are described above in connection with FIG. 1. Examples of resources are described above in connection with FIG. 1.

At block 302, the processing logic communicates first information characterizing at least one of the plurality of schedulable partitions. At least one example of this communication or the first information is described above in connection with FIG. 1 (e.g., the scheduler 143, the agent 142, any combination thereof, etc.). The processing logic can communicate the information in block 302 via an API, such as the example API 145 described above in connection with FIG. 1.

At block 303, the processing logic receives second information indicating a selection of one or more of the at least one of the plurality of schedulable partitions to execute at least one workload. At least one example of this selection or the second information is described above in connection with FIG. 1 (e.g., the scheduler 143, the agent 142, any combination thereof, etc.).

The processing logic, at block 304, monitors the selection described above in connection with block 303. At least one example of monitoring the selection is described above in connection with FIG. 1 (e.g., the scheduler 143, the agent 142, any combination thereof, etc.).

At block 305, the processing logic enforces the selection. At least one example of enforcing the selection is described above in connection with FIG. 1 (e.g., the scheduler 143, the agent 142, any combination thereof, etc.) FIG. 3B is a flow diagram of a method 325 of acquiring resources of at least one host system that are eventually instantiated into a plurality of schedulable partitions, in accordance with one or more embodiments. The method 325 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiment, at least one portion of the method 325 may be performed by an agent. For example, some or all of the method 325 can be performed by the agent 142 described above in connection with FIG. 1.

With reference to FIG. 3B, the method 325 illustrates example functions used by various embodiments. Although specific function blocks ("blocks") are disclosed in the method 325, such blocks are examples. That is, embodiments are well suited to performing various other blocks or variations of the blocks recited in the method 325. It is appreciated that the blocks in the method 325 may be performed in an order different than presented, and that not all of the blocks in the method 325 may be performed.

In an embodiment, the method 325 includes three blocks 306-308. At block 306, the processing logic requests information from at least one of the host system(s) described above in connection with the method 300 described above in connection with FIG. 3A. In embodiments, the information of block 306 is associated with the resources of the host system(s). Such information can include information about the resources, such as their characteristics. At least one example of such information is provided above in connection with the description of FIG. 1 (e.g., the scheduler 143, the agent 142, any combination thereof, etc.). In an embodiment, the processing logic requests the information about the resources by transmitting or causing transmission of a query to the host system(s), by transmitting or causing transmission of any other suitable message to the host system(s), or by any other techniques or technology that enables the processing logic to acquire the information about the resources of the host system(s). At least one example of the request is provided above in connection with the description of FIG. 1 (e.g., the scheduler 143, the agent 142, any combination thereof, etc.).

At block 307, the processing logic receives the information associated with the resources from one or more of the host system(s). The information can be communicated using any message, technique, or technology that enables the processing logic to receive the information about the resources of the host system(s) from at least one of the host system(s). For example, at least one of the host system(s) can transmit a response (e.g., a message, etc.) that includes the requested information to the processing logic. At least one example of the host system(s)' response is provided above in connection with the description of FIG. 1 (e.g., the host system 110a, 110b, combination thereof, etc.).

At block 308, the processing logic proceeds with performing the method 300 described above in connection with FIG. 3A. In one embodiment, method 325 includes block 306 alone, block 307 alone, or both blocks 306 and 307.

FIG. 3C is a flow diagram of a method 350 of activating an instantiation of resources of at least one host system into a plurality of schedulable partitions, in accordance with one or more embodiments The method 350 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiment, at least one portion of the method 350 may be performed by an agent. For example, some or all of the method 350 can be performed by the agent 142 described above in connection with FIG. 1.

With reference to FIG. 3C, the method 350 illustrates example functions used by various embodiments. Although specific function blocks ("blocks") are disclosed in the method 350, such blocks are examples. That is, embodiments are well suited to performing various other blocks or variations of the blocks recited in the method 350. It is appreciated that the blocks in the method 350 may be performed in an order different than presented, and that not all of the blocks in the method 350 may be performed.

In one embodiment, the method 350 includes three blocks 309-311. At block 309, the processing logic receives information comprising a user configuration. At least one example of the information comprising the user configuration, the source of the information comprising the user configuration, or communication of the user configuration is provided above in connection with the description of FIG. 1 (e.g., the scheduler 143, the agent 142, the user system 146, the config. data 147, any combination thereof, etc.). In one embodiment, the processing logic receives the information comprising the user configuration by receiving a message or by any other techniques or technology that enables the processing logic to receive the information comprising the user configuration. In one embodiment, the processing logic receives the information comprising the user configuration via an API, such as the API 145 described above in connection with FIG. 1.

At block 310, the processing logic determines that the resources of one or more of the host system(s) should be instantiated into a plurality of schedulable partitions. In one embodiment, the processing logic makes this determination in view of the information comprising the user configuration. At least one example of the processing logic using the information comprising the user configuration to determine that the resources of one or more of the host system(s) should be instantiated into a plurality of schedulable partitions is provided above in connection with the description of FIG. 1 (e.g., the scheduler 143, the agent 142, the user system 146, the config. data 147, any combination thereof, etc.). The determination of block 310 can be performed using any suitable technique or technology.

Figure 4:
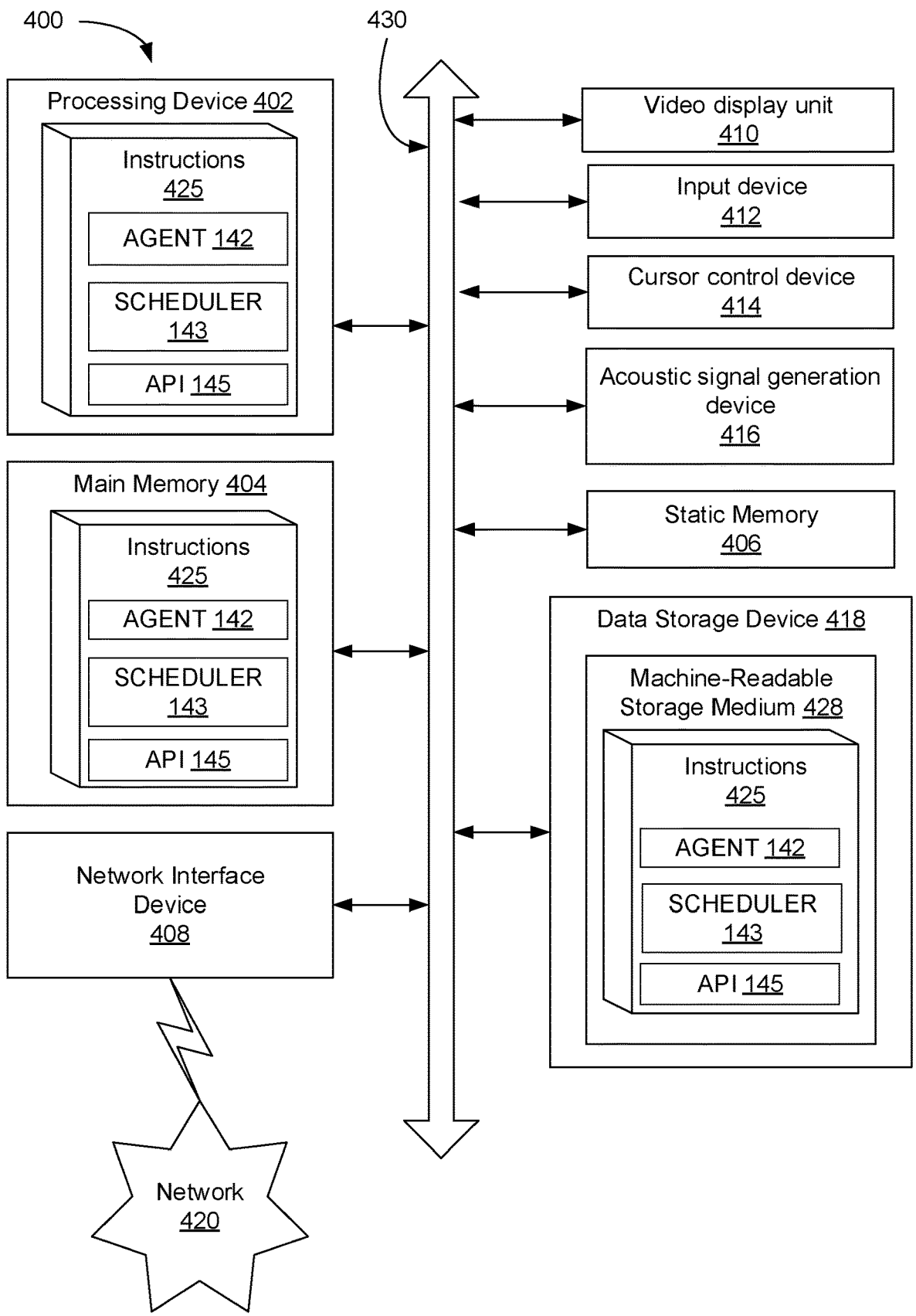
FIG. 4 is a block diagram of an example computing device that may implement one or more of the operations described herein, in accordance with some embodiments.

At block 311, the processing logic proceeds with performing the method 300 described above in connection with FIG. 3A. In one embodiment, the method 350 includes block 309 alone, block 310 alone, or both blocks 309 and 311 FIG. 4 illustrates an example computing device 400 that may implement one or more of the embodiments described herein, in accordance with some embodiments. The computing device 400 may be connected to at least one other computing device in a LAN, an intranet, an extranet, and/or the Internet. The computing device 400 may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated in FIG. 4, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

The processing device 402 may be provided by one or more general-purpose processing devices such as a microprocessor, CPU, GPU, or the like. In an illustrative example, the processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also comprise one or more special-purpose processing devices such as an application specific integrated circuit (ASIC), a field programmable gate array (FPGA), a digital signal processor (DSP), network processor, or the like. The processing device 402 may be configured to execute at least one of the operations described herein, in accordance with one or more aspects of the present disclosure, for performing at least one of the operations and/or steps discussed herein.

The computing device 400 may further include a network interface device 408, which may communicate with a network 420. The computing device 400 also may include a video display unit 410 (e.g., a liquid crystal display (LCD) or a cathode ray tube (CRT)), an input device 412 (e.g., a keyboard), a cursor control device 414 (e.g., a mouse), and an acoustic signal generation device 416 (e.g., a speaker). In one embodiment, video display unit 410, input device 412, and cursor control device 414 may be combined into a single component or device (e.g., an LCD touch screen). In one embodiment, each of components 410, 412, 414, and 416 is optional.

The data storage device 418 may include a non-transitory computer-readable storage medium 428, which can store one or more sets of instructions 425 that may include instructions for one or more of the components required to implements schedulable partition, as described herein. Examples of such components are the agent 142, the scheduler 143, the API 145, etc. The instructions 425 are for carrying out at least one of the operations described herein, in accordance with one or more aspects of the present disclosure. The instructions 425 may also reside, completely or at least partially, within the main memory 404 and/or within the processing device 402 during execution thereof by the computing device 400, the main memory 404, and the processing device 402 also constituting one or more computer-readable media. The instructions 425 may further be transmitted or received over a network 420 via the network interface device 408.

While the computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" should also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media. The term "computer-readable storage medium" shall also cover a non-transitory computer-readable storage medium or multiple non-transitory computer-readable storage media.

Unless specifically stated otherwise, terms such as "receiving," "routing," "updating," "providing," or the like, refer to actions and processes performed or implemented by one or more computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

The use of "A or B", "A and B", "A and/or B", "at least one of A or B", "at least one of A and B", "at least one of A and/or B", "one or more of A or B", "one or more of A and B", "one or more of A and/or B", and their variations refer to at least one selected from a group comprising: (i) A only; (ii) B only; (iii) A and B.

In the present document (e.g., the detailed description, the claims, the figures, etc.), the phrase "in view of" has the same definition as "based, at least in part, on."

It should also be noted that in some alternative implementations, the functions/acts/operations noted may occur out of the order noted in the figures. For example, two figures shown in succession may in fact be executed substantially concurrently or may sometimes be executed in the reverse order, depending upon the functionality/acts involved. In at least one embodiment described herein, one or more functions/acts/operations may be omitted depending on the embodiments and the goal of the inventive concepts set forth herein.

Although the processes (e.g., operations, methods, etc.) were described in a specific order, it should be understood that other operations may be performed in between described operations, described operations may be adjusted so that they occur at slightly different times or the described operations may be distributed in a system which allows the occurrence of the processing operations at various intervals associated with the processing. Furthermore, one or more parts of the processes may be omitted in at least one embodiment.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

In the following description, for purposes of explanation, numerous specific details are set forth in order to provide a thorough understanding of the inventive concept(s). As part of this description, some structures and devices may be shown in block diagram form in order to avoid obscuring the inventive concepts described herein. Moreover, the language used in this disclosure has been principally selected for readability and instructional purposes, and may not have been selected to delineate or circumscribe some or all of the inventive subject matter, resort to the claims being necessary to determine such inventive subject matter. Reference in the specification to "one embodiment," "an embodiment," "another embodiment," "one example," "an example," "another example," and their variations means that a particular feature, structure, or characteristic described in connection with the embodiment or example is included in at least one embodiment or example of the inventive subject matter, and multiple references to "one embodiment," "an embodiment," "another embodiment," "one example," "an example," "another example," and their variations should not be understood as necessarily all referring to the same embodiment or example.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the art having the benefit of this disclosure.

What is claimed is:

1. A method, comprising:
retrieving information characterizing at least one of a plurality of schedulable partitions via an application programming interface (API) that is exclusively used to communicate the information, each of the plurality of schedulable partitions comprising resources of at least one of a plurality of host systems of a cloud computing environment;
determining, in view of the information, that at least one of the plurality of schedulable partitions comprises a processing resource that is coupled to local storage resource;
determining an availability and a suitability of the at least one of the plurality of schedulable partitions for executing a workload responsive to determining that the at least one of the plurality of schedulable partitions comprises the processing resource that is coupled to the local storage resource; and
selecting one or more of the at least one of the plurality of schedulable partitions to execute the workload in view of the availability and the suitability.

2. The method of claim 1, wherein the at least one of the plurality of host systems comprises a cloud computing environment.

3. The method of claim 1, wherein the at least one of the plurality of schedulable partitions comprises one or more of a non-uniform memory access (NUMA) architecture or a sub-NUMA architecture.

4. The method of claim 1, wherein the plurality of schedulable partitions are instantiated from the resources of the at least one of the plurality of host systems.

5. The method of claim 4, wherein the plurality of schedulable partitions are instantiated from the resources of the at least one of the plurality of host systems in view of a user configuration.

6. A system, comprising:
memory; and
a processing device, operatively coupled to the memory, to:
retrieve information characterizing at least one of a plurality of schedulable partitions via an application programming interface (API) that is exclusively used to communicate the information, each of the plurality of schedulable partitions comprising resources of at least one of a plurality of host systems of a cloud computing environment;
determine, in view of the information, that at least one of the plurality of schedulable partitions comprises a processing resource that is coupled to local storage resource;
determine an availability and suitability of the at least one of the plurality of schedulable partitions for executing the workload responsive to determining that the at least one of the plurality of schedulable partitions comprises the processing resource that is coupled to the local storage resource; and
select one or more of the at least one of the plurality of schedulable partitions to execute the workload in view of the determined availability and suitability.

7. The system of claim 6, wherein the at least one of the plurality of host systems comprises a cloud computing environment.

8. The system of claim 6, wherein the at least one of the plurality of schedulable partitions comprises one or more of a non-uniform memory access (NUMA) architecture or a sub-NUMA architecture.

9. The system of claim 6, wherein the plurality of schedulable partitions are instantiated from the resources of the at least one of the plurality of host systems.

10. The system of claim 9, wherein the plurality of schedulable partitions are instantiated from the resources of the at least one of the plurality of host systems in view of a user configuration.

11. A non-transitory computer-readable storage medium including instructions that, when executed by a processing device, cause the processing device to:
retrieve information characterizing at least one of a plurality of schedulable partitions via an application programming interface (API) that is exclusively used to communicate the information, each of the plurality of schedulable partitions comprising resources of at least one of a plurality of host systems of a cloud computing environment;
determine, in view of the information, that at least one of the plurality of schedulable partitions comprises a processing resource that is coupled to local storage resource;
determine an availability and suitability of the at least one of the plurality of schedulable partitions for executing the workload responsive to determining that the at least one of the plurality of schedulable partitions comprises the processing resource that is coupled to the local storage resource; and
select one or more of the at least one of the plurality of schedulable partitions to execute the workload in view of the determined availability and suitability.

12. The non-transitory computer-readable storage medium of claim 11, wherein the at least one of the plurality of host systems comprises a cloud computing environment.

13. The non-transitory computer-readable storage medium of claim 11, wherein the at least one of the schedulable partitions comprises one or more of a non-uniform memory access (NUMA) architecture or a sub-NUMA architecture.

14. The non-transitory computer-readable storage medium of claim 11, wherein the plurality of schedulable partitions are instantiated from the resources of the at least one of the plurality of host systems.

15. The non-transitory computer-readable storage medium of claim 11, wherein the plurality of schedulable partitions are instantiated from the resources of the at least one of the plurality of host systems in view of a user configuration.

* * * * *